United States Patent
Moriyama

Patent Number: 4,856,907
Date of Patent: Aug. 15, 1989

[54] KNEADER

[76] Inventor: Masao N. Moriyama, No. 508-13, Tendocho 17, Nishinomiya, Hyogo, 663, Japan

[21] Appl. No.: 201,597

[22] Filed: May 31, 1988

[30] Foreign Application Priority Data

May 29, 1987 [JP] Japan .................. 62-136193

[51] Int. Cl.$^4$ .................. B01F 7/04; B29B 1/06
[52] U.S. Cl. .................. 366/97; 366/147
[58] Field of Search .......... 366/99, 98, 97, 69, 366/75, 76, 77, 279, 292, 300, 301, 325, 329, 330, 64, 297, 147, 83, 85, 79, 66; 425/200, 201, 204, 207

[56] References Cited

U.S. PATENT DOCUMENTS

| | | | |
|---|---|---|---|
| 2,736,754 | 2/1956 | Webb | 366/97 |
| 3,672,644 | 6/1972 | Crixell | 425/201 |
| 4,097,926 | 6/1978 | Face | 366/64 |
| 4,412,747 | 11/1983 | Moriyama | 366/99 |
| 4,509,860 | 4/1985 | Lasar | 366/99 |

Primary Examiner—Robert W. Jenkins
Attorney, Agent, or Firm—Koda and Androlia

[57] ABSTRACT

The present invention discloses a kneader having a vessel for housing a material to be kneaded, rotor shafts passing through opposite two lateral walls of the vessel, and blades for kneading the material formed at the outer peripheries of the rotor shafts inside of the vessel.

In the kneader, those portions of the rotor shafts located inside of the vessel, are straight, and an external member having the blades is fitted on each of the rotor shafts at the straight portion thereof. The external members have both ends which extend to the outside of the opposite two lateral walls of the vessel, and are secured to the rotor shafts outside of the opposite two lateral walls of the vessel.

9 Claims, 2 Drawing Sheets

KNEADER

BACKGROUND OF THE INVENTION

The present invention relates to a kneader for kneading a viscous material such as plastic, rubber, etc., and more particularly to the arrangement of the rotor shafts thereof.

There is known a method for making the rotor shafts of a kneader, by which after the shafts have been lathed, blades separately made are welded to the shafts. According to this method, the welding heat generates thermal stress on the shafts. This may cause the shafts not to be axially aligned.

In a pressure-type kneader for kneading a material under a high pressure in an enclosed space, the material leaks from the kneading chamber to the outside or the material leaks in the kneading chamber to the spaces inside of the blades after passing through gaps, if any, between the shafts and the blades. Therefore, the kneader needs to be sealed against such material leakage.

Further, when the shafts are made separately from the blades, a corrosion resisting material such as ceramic, stainless steel, engineering plastic may be used as the blade material. When the blades made of such corrosion resisting material are to be secured to the shafts, it should not be allowed to use, in the kneading chamber, bolts, screws or other members which may be corroded.

Further, in the kneader a heat transfer medium is generally circulated inside of the blades to cool or heat a material to be kneaded. It is therefore preferable to provide wide spaces in the blade insides to enhance the heat conduction with respect to the blade surfaces.

SUMMARY OF THE INVENTION

It is an object of the present invention to provide a kneader having rotor shafts which solve and satisfy all the problems and requirements above-mentioned.

The kneader in accordance with the present invention has rotor shafts which pass through the opposite two lateral walls of a vessel, and is characterized in that those portions of the rotor shafts located inside of the vessel, are straight, and in that an external member having blades is fitted on each of the rotor shafts at the straight portion thereof. The external members have both ends extending to the outside of the opposite two lateral walls of the vessel, and are secured to the rotor shafts outside of the opposite two lateral walls of the vessel.

The separate arrangement of the rotor shafts from the blades reduces the number of machining steps for the rotor shafts, and eliminates thermal stress which would otherwise be generated by welding or the like. This improves the precision in straightness of the rotor shafts. Further, the external members extend to the outside of the lateral walls of the vessel. This enables the external members to be secured to the rotor shafts outside of the vessel. This increases the contact areas of the external members with the rotor shafts, thereby to improve the adhesion of the external members to the rotor shafts. When the external members are made thin, the conduction of heat from the heat transfer medium to the material is improved.

DESCRIPTION OF THE PREFERRED EMBODIMENTS

The following description will discuss in more detail the present invention with reference to the attached drawings which show an embodiment of the present invention, by way of example.

Figure 1:
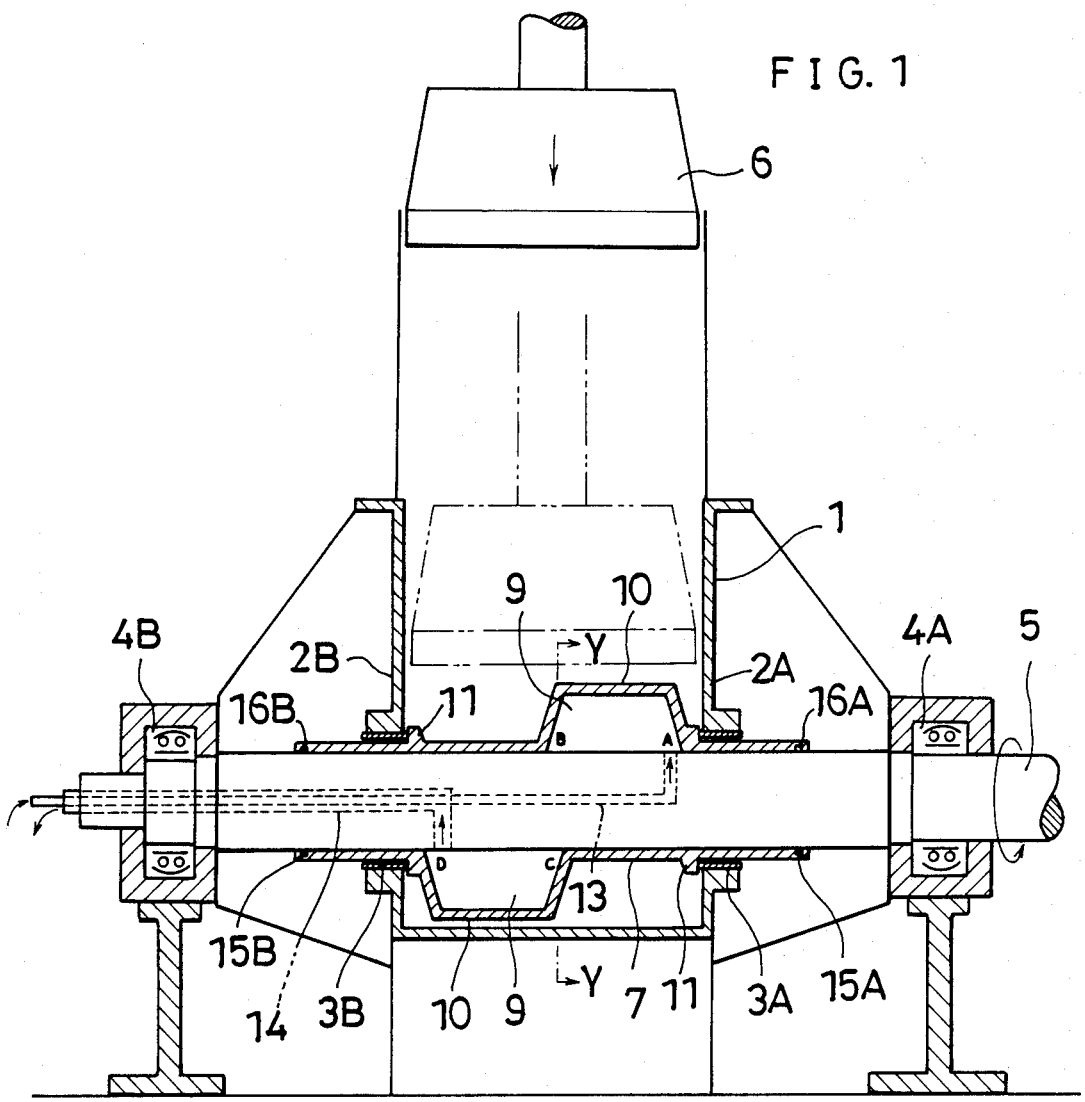
FIG. 1 is a vertical section view of an embodiment of the present invention.

FIG. 1 is a vertical section view of an embodiment of the present invention.

Two rotor shafts 5 pass through opposite two lateral walls 2A, 2B of a vessel 1 for housing a raw material to be kneaded. Each of the rotor shafts 5 is supported by bearings 4A, 4B and driven in rotation by a motor (not shown) through a transmission mechanism such as gears, speed reduction means, etc. Sealing means 3A, 3B for preventing the raw material from leaking are disposed at those portions of the lateral walls 2A, 2B through which each rotor shaft 5 passes. A pressurizing lid 6 is disposed above the vessel 1, the lid 6 being vertically movable for pressurizing the raw material by a hydraulic cylinder.

Figure 3:
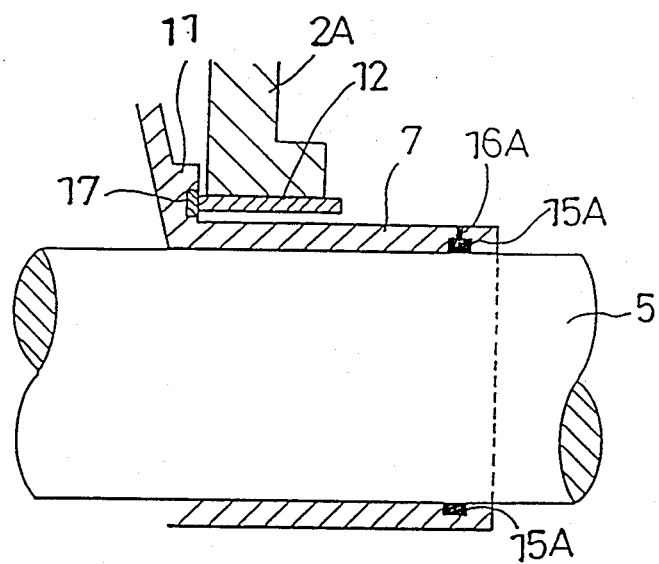
FIG. 3 is an enlarged view of a portion in FIG. 1.

At least that portion of each rotor shaft 5 which is located inside the vessel 1, has a constant diameter and does not have an intermediate projection. An external member 7 is fitted on each rotor shaft 5 at the outer periphery thereof. The external members 7 include: cylindrical portions which extend to the outside of the lateral walls of the vessel and which are fitted on the rotor shafts 5; blade portions 10 which form spaces 9 together with the rotor shafts 5; and flange portions 11 which constitute part of the sealing means; the cylindrical portions, the blade portions 10 and the flanges 11 being integrally formed. The cylindrical portions of the external members 7 at both ends thereof are shrink-fitted to the rotor shafts 5. As shown in FIG. 3, the flange portions 11 are disposed for forming sealing surfaces together with the end surfaces of cylindrical packings 12. Rings 17 made of a hard metal material such as ceramic, etc. may be embedded in the sealing surfaces of the flange portions 11.

Figure 2:
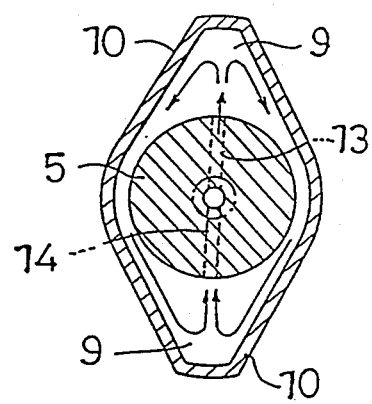
FIG. 2 is a section view taken along the line Y—Y in FIG. 1.

The rotor shafts 5 are provided in the insides thereof with passages for heat transfer medium 13, 14 which extend from the space portions 9 in the external members 7 to one ends of the rotor shafts 5. The passages 13, 14 cause a heat transfer liquid for cooling or heating to be circulated. More specifically, the circulation passages formed in the external members 7 start from the tips of the passages 13, enter into points A, pass through points B, reach to points C along the outer peripheries of the rotor shafts 5, pass through points D and return to the passages 14. The heat transfer liquid is moved from one space portions 9 to the other space portions 9 while passing through passages along the outer peripheries of the rotor shafts 5 as shown in FIG. 2. The heat transfer liquid may also be circulated in the reverse direction from the points D to the points A.

The external members 7 are provided in both ends thereof with loop-like grooves in the circumferential direction thereof. Resin is introduced under pressure to these grooves through inlet ports 16A, 16B, thereby to form packings 15A, 15B. It is noted that the packings 15A, 15B may be omitted if the shrink-fit of the external members 7 at both ends thereof securely prevents the heat transfer liquid from leaking.

According to the present invention, the external members 7 are preferably made by the lost-wax process. The material for making the external members 7 includes stainless steel, ceramic, heat-resisting plastic, a variety of metals, and other composite material.

According to the kneader of the present invention, external members are fitted on the rotor shafts at the outer peripheries thereof, and have end portions which extend to the outside of the lateral walls of the vessel. The external members are secured to the rotor shafts outside of the vessel lateral walls. This eliminates the possibility that a material to be kneaded leaks through gaps between the rotor shafts and the external members. Such arrangement also simplifies the structure of the vessel interior and improves the reliability. According to the present invention, even though the external members are made thin, the contact areas between the external members and the rotor shafts are increased to improve the adhesion of the external member to the rotor shafts. This also improves the heat efficiency.

It should be understood that the present disclosure is for the purpose of illustration only and that this invention includes all modifications and equivalents which fall within the scope of the appended claims.

What is claimed is:

1. A kneader comprising:
   a vessel;
   rotor shafts passing through said vessel, those portions of said rotor shafts located inside of said vessel being straight;
   bearings for supporting said rotor shafts at positions remote, from said vessel;
   external members including cylindrical portions and blades; and
   means for fixedly fitting the cylindrical portions of said external members at both ends thereof onto said rotor shafts, said cylindrical portions extending to the outside of said vessel.

2. A kneader as set forth in claim 1, wherein a heat transfer medium for cooling or heating purposes is circulated in space portions formed between the blades of the external members and the straight portions of the rotor shafts.

3. A kneader as set forth in claim 1, further comprising means for fixing the external members to the rotor shafts, said means having an arrangement in which plastic is introduced under pressure into grooves formed in the external members in the circumferential direction thereof in the vicinity of both ends of said external members.

4. A kneader as set forth in claim 1, wherein the external members are formed by the lost-wax process.

5. A kneader as set forth in claim 1, wherein both ends of the external members extending to the outside of two lateral walls of the vessel are shrink-fitted to the rotor shafts.

6. A kneader comprising:
   a vessel for receiving therein a material to be kneaded;
   blade members constituted of a hollow blade or blades and a hollow cylinder outdistancing side walls of said vessel;
   rotor shafts penetrating said vessel through said side walls of said vessel, each of said rotor shafts being accepted in said hollow cylinder of each of said blade members and carrying each of said blades members with said hollow blade or blades kept within said vessel and with said hollow cylinder having both its ends exposed outside said vessel and fixed to the rotor shaft; and
   bearings for rotatably supporting said rotor shafts at positions remote from said vessel.

7. A kneader as defined in claim 6, wherein each of said rotor shafts is provided with a channel for making a thermal medium circulate therethrough in the space formed in said hollow blade or blades.

8. A kneader as defined in claim 6 or 7, wherein both ends of said hollow cylinder are fixed to a corresponding rotor shaft by means of a plastic material compressively introduced into grooves formed at least at either inner peripherals of the hollow cylinder or at outer peripherals of the corresponding rotor shaft.

9. A kneader as defined in claim 6 or 7, wherein both ends of said hollow cylinder are fixed to a corresponding rotor shaft by means of shrink fitting.

* * * * *

UNITED STATES PATENT AND TRADEMARK OFFICE
CERTIFICATE OF CORRECTION

PATENT NO. : 4,856,907
DATED : August 15, 1989
INVENTOR(S) : MASAO MORIYAMA

It is certified that error appears in the above-identified patent and that said Letters Patent is hereby corrected as shown below:

Title page:

Item [76] Inventor: Change "Masao N. Moriyama, No. 508-13, Tendocho 17, Nishinomiya, Hyogo, 663, Japan" to --Masao Moriyama, No. 508-13, Tendocho 17, Nishinomiya, Hyogo, 663, Japan--

Signed and Sealed this

Twelfth Day of June, 1990

*Attest:*

HARRY F. MANBECK, JR.

*Attesting Officer*      *Commissioner of Patents and Trademarks*